United States Patent
Alshiha et al.

(10) Patent No.: US 11,583,984 B2
(45) Date of Patent: Feb. 21, 2023

(54) INJECTION FITTING INTERNAL CHECK VALVE RETRIEVAL TOOL

(71) Applicant: Saudi Arabian Oil Company, Dhahran (SA)

(72) Inventors: Saad M. Alshiha, Dhahran (SA); Bader M. Jarallah, Dammam (SA); Hassan A. Alsalloum, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 122 days.

(21) Appl. No.: 17/008,152

(22) Filed: Aug. 31, 2020

(65) Prior Publication Data

US 2022/0063072 A1    Mar. 3, 2022

(51) Int. Cl.
*B25B 27/24* (2006.01)
*F16K 43/00* (2006.01)

(52) U.S. Cl.
CPC ............ *B25B 27/24* (2013.01); *F16K 43/003* (2013.01)

(58) Field of Classification Search
CPC ..... B25B 27/02; B25B 27/062; B25B 27/023; B25B 27/24; F16K 43/003
See application file for complete search history.

(56) References Cited

U.S. PATENT DOCUMENTS

| | | | |
|---|---|---|---|
| 3,644,982 A * | 2/1972 | Anderson | F16K 43/00 29/213.1 |
| 3,791,011 A * | 2/1974 | Keys | B25B 27/026 29/726 |
| 4,000,556 A * | 1/1977 | Ciminero | B23P 19/025 29/280 |
| 4,741,509 A | 5/1988 | Bunch et al. | |
| 3,273,855 A | 9/1996 | Wells | |
| 9,903,483 B2 | 2/2018 | Liu | |
| 2014/0183396 A1 | 7/2014 | Hunter et al. | |
| 2014/0215786 A1 * | 8/2014 | Munguia | B25B 27/24 29/221.6 |
| 2015/0113786 A1 | 4/2015 | Tuwairgi | |

(Continued)

FOREIGN PATENT DOCUMENTS

GB    2517308 A    2/2015

OTHER PUBLICATIONS

International Search Report and Written Opinion for PCT Application # PCT/US2021/046381, dated Nov. 19, 2021. 3 pages.

(Continued)

*Primary Examiner* — Seahee Hong
(74) *Attorney, Agent, or Firm* — Leason Ellis LLP

(57) ABSTRACT

A system for retrieving a failed inner check valve that is part of an injection fitting includes a hollow isolation valve assembly that includes a first section and a second section that is detachable from the first section. The first section includes a first valve and the second section including a relief valve. The first valve moves between a closed position in which the first section is completely occluded and an open position and can be in the form of a ball valve. The system also includes an extraction tool that is configured to be coupled to and advanced along the isolation valve assembly. An elongated inner key is configured to be received into and pass through the hollow isolation valve assembly. A distal end of the inner key is configured to engage and unscrew the failed internal check valve for removal thereof.

16 Claims, 8 Drawing Sheets

(56) References Cited

U.S. PATENT DOCUMENTS

2018/0038491 A1    2/2018  Gaburri et al.
2020/0269400 A1*   8/2020  Jones .................... B25B 13/48

OTHER PUBLICATIONS

Chisholm, Dean. "Discussion Paper for Modifying Pipeline Engineering Standards for Sealant Injection Fitting Ins Pipeline Valves." Sealweld Services—Pipeline Valve Maintenance, Aug. 10, 1994, pp. 1-18.
"Leak-Lock Adapter." Seal Sanat Raga: Adapter, www.sealsanat.com/en/?current=page&content=1179. 5 pages.
Parker Hannifin. "Valve Fittings and Wellhead Components", Parker Hannifin Corporation. 28 pages.
"API 6D Valves." LAcier, www.lacier.in/gate/. 4 pages.
"Small-Bore Fabrirated Grove." Small-Bore Fabricated Grove Valve | Schlumberger Products, www.products.slb.com/valves/gate-valves/small-bore-grove-valve. 3 pages.

* cited by examiner

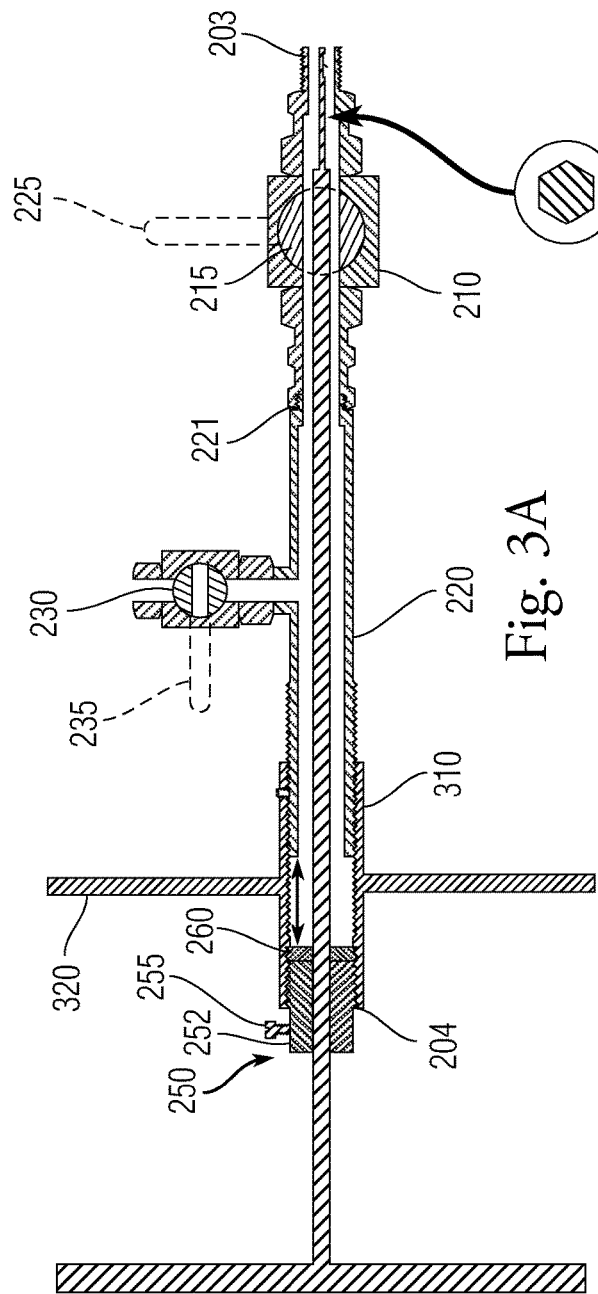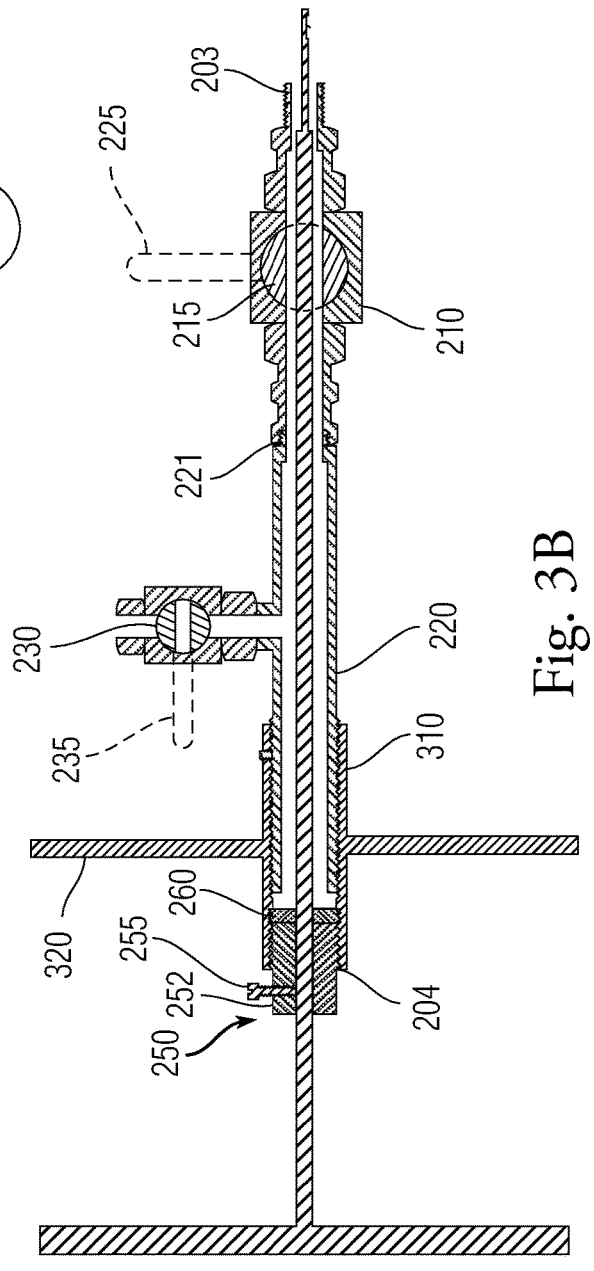
Fig. 3A
Fig. 3B

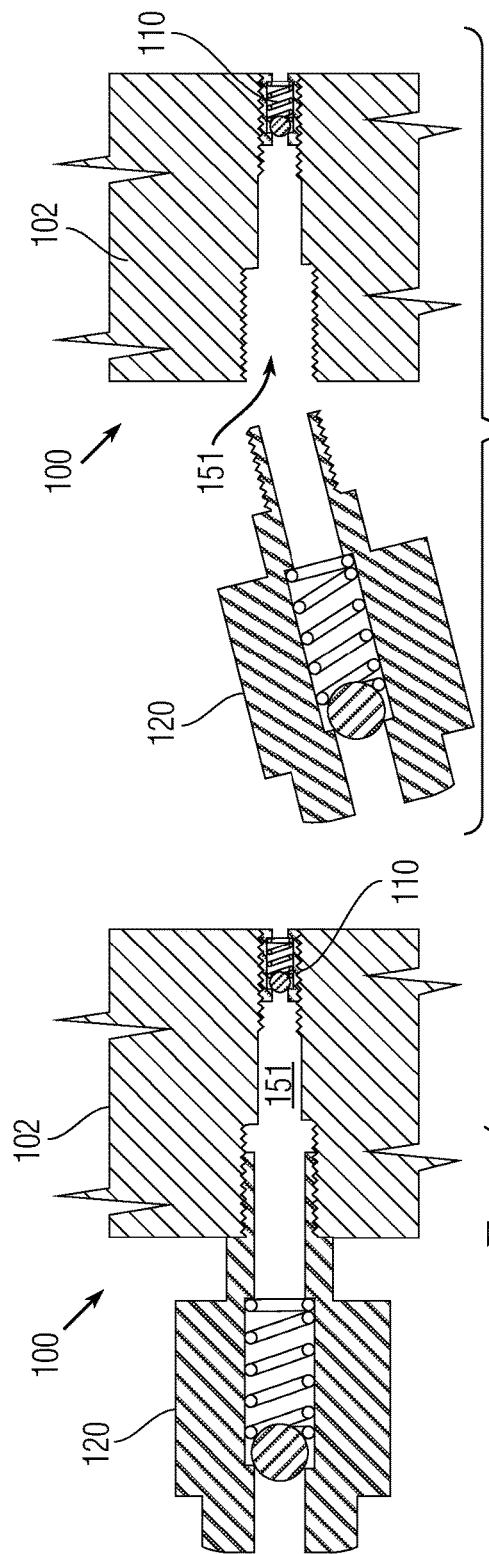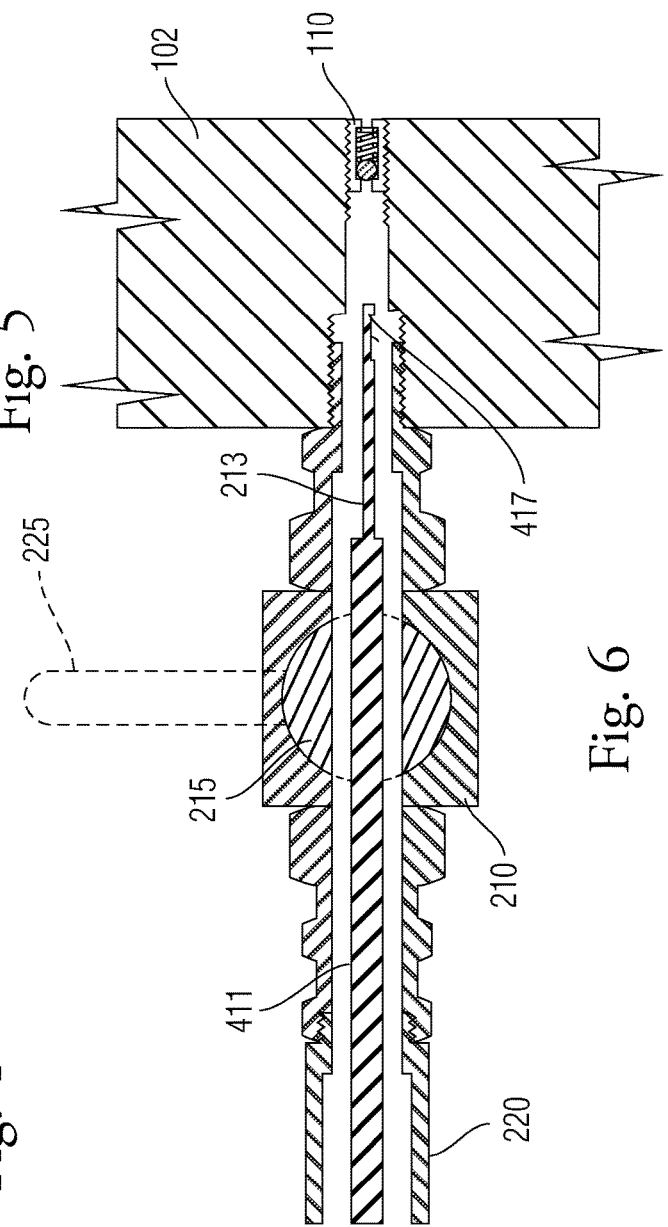

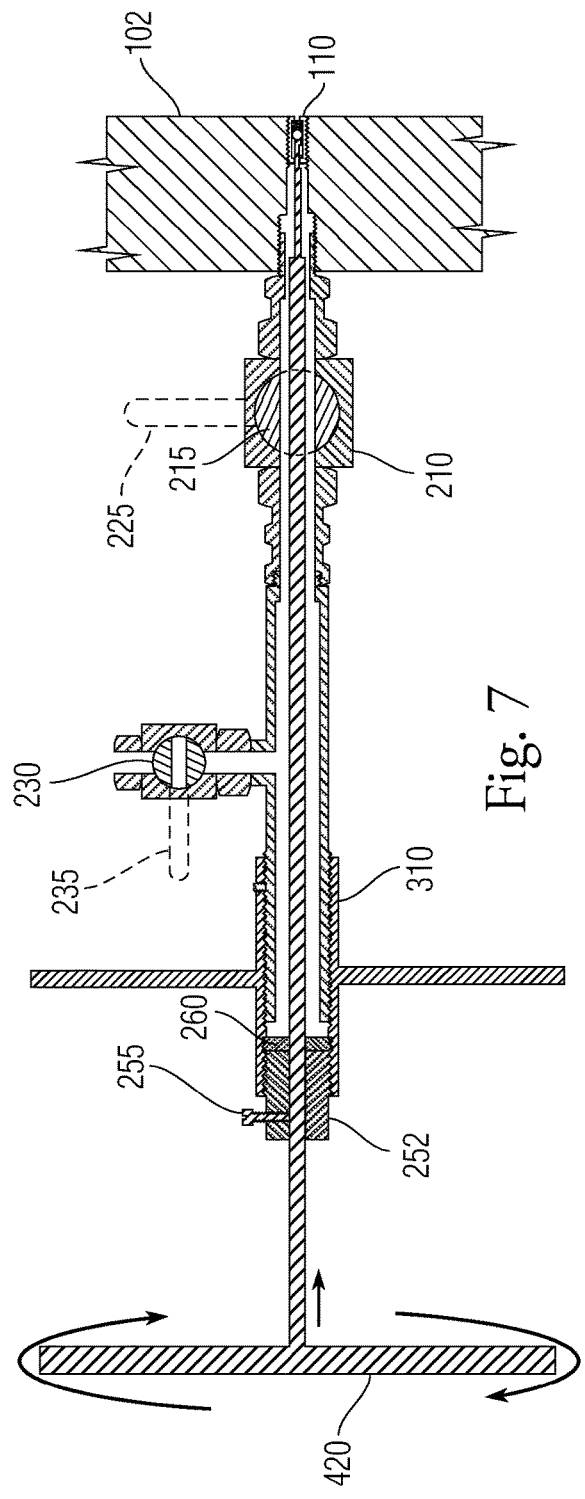
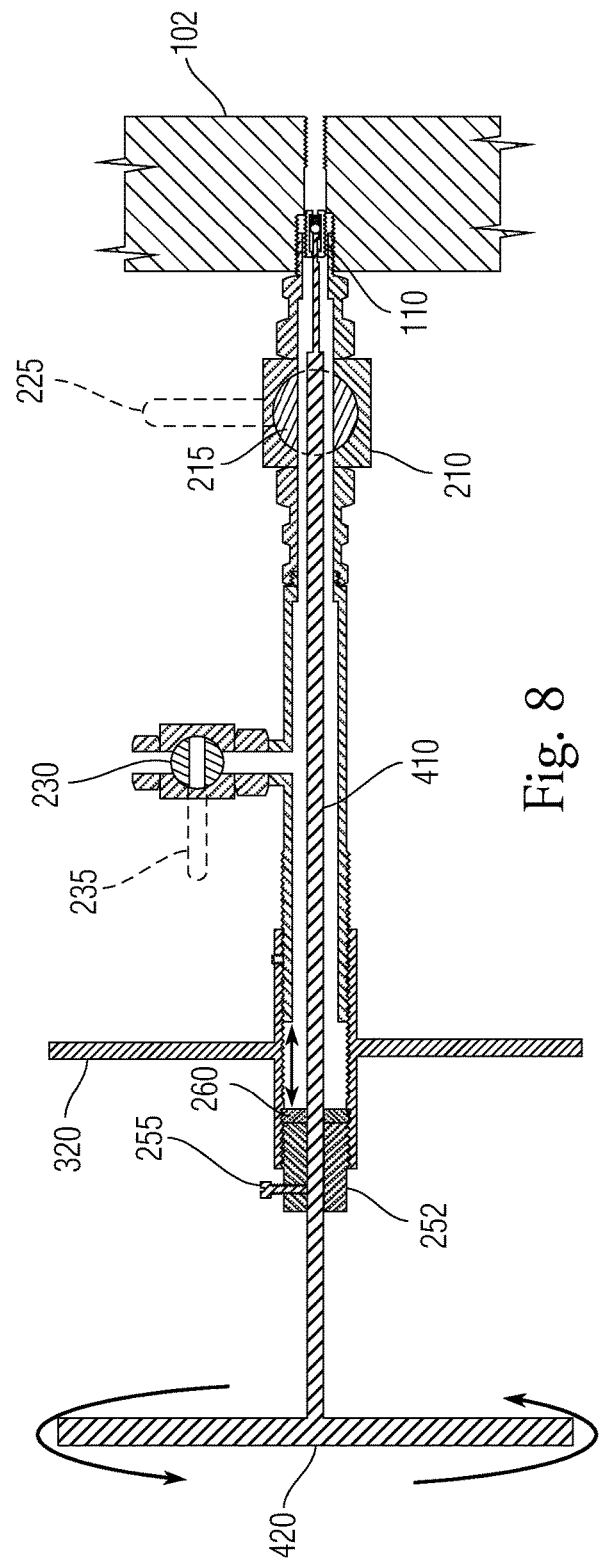

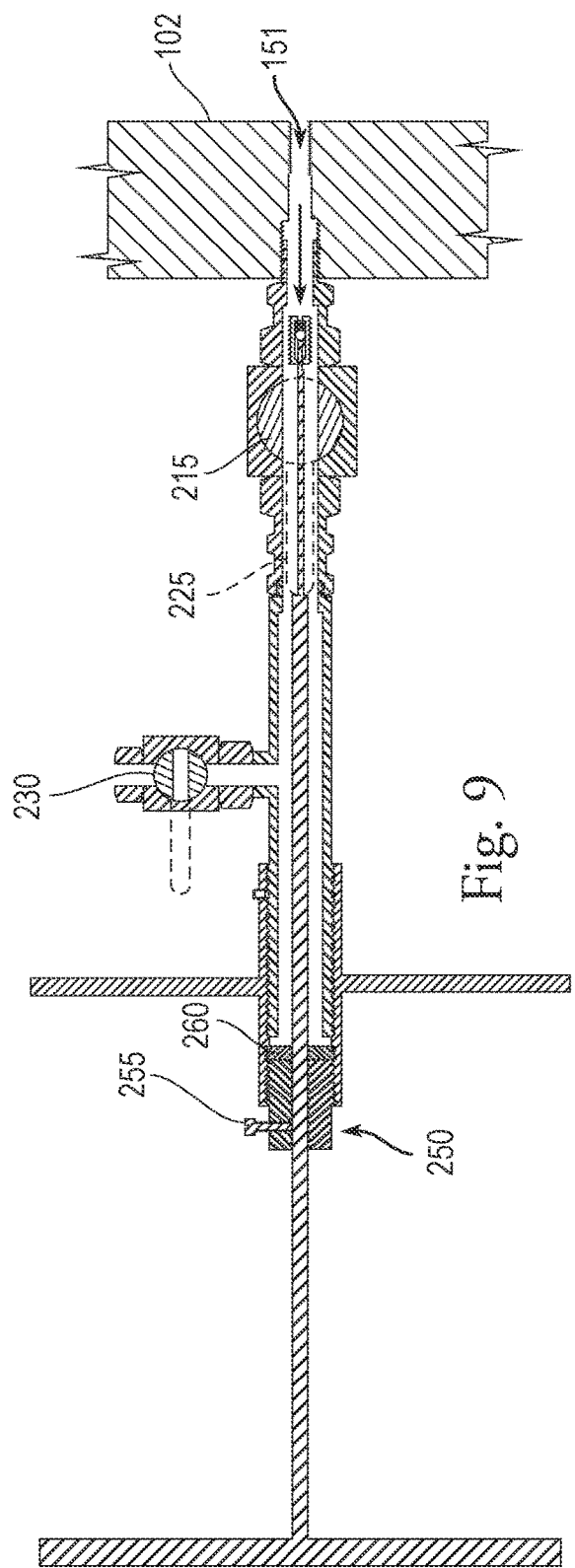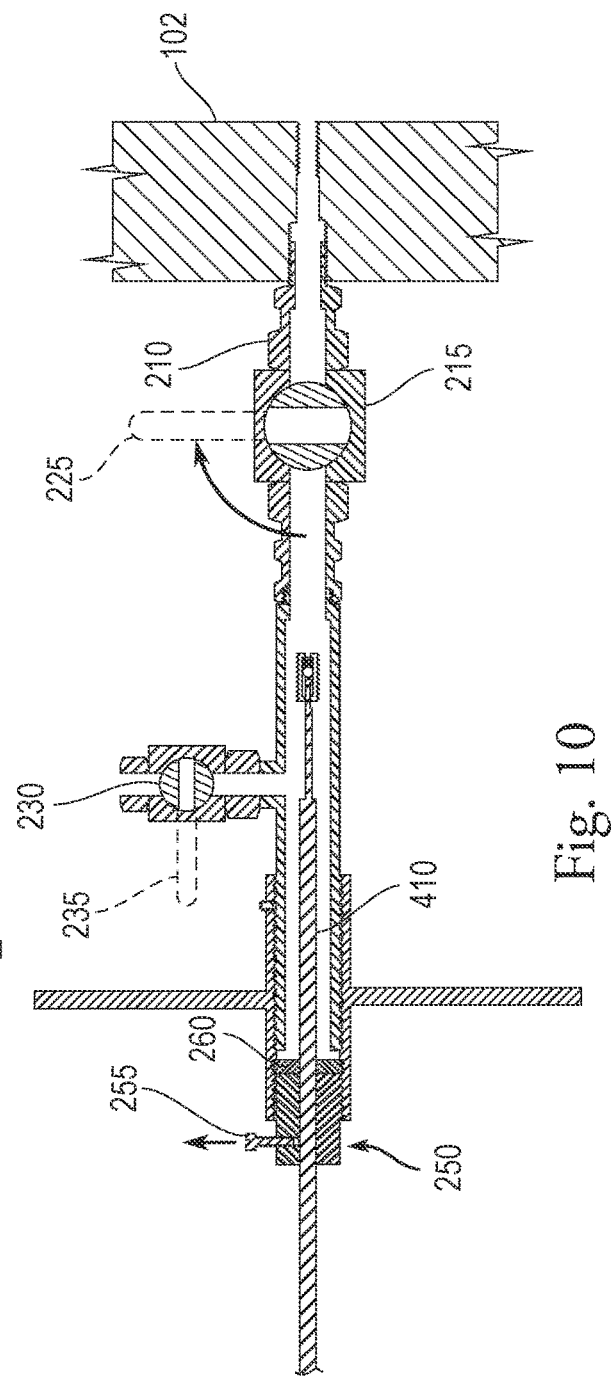

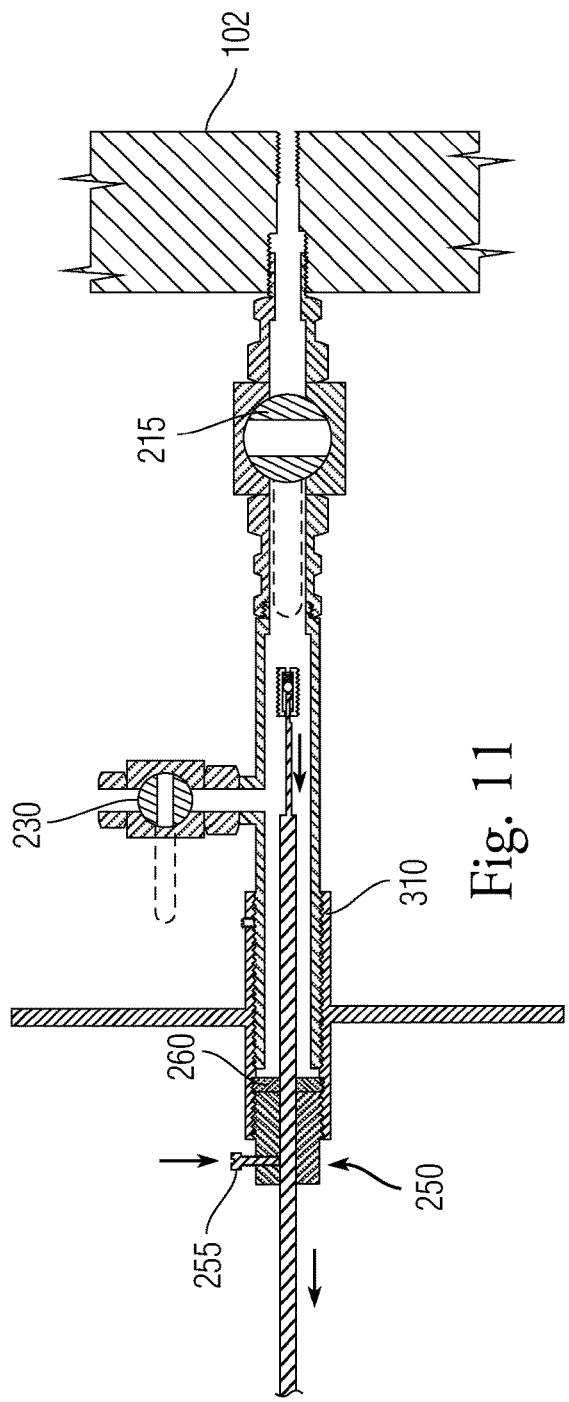
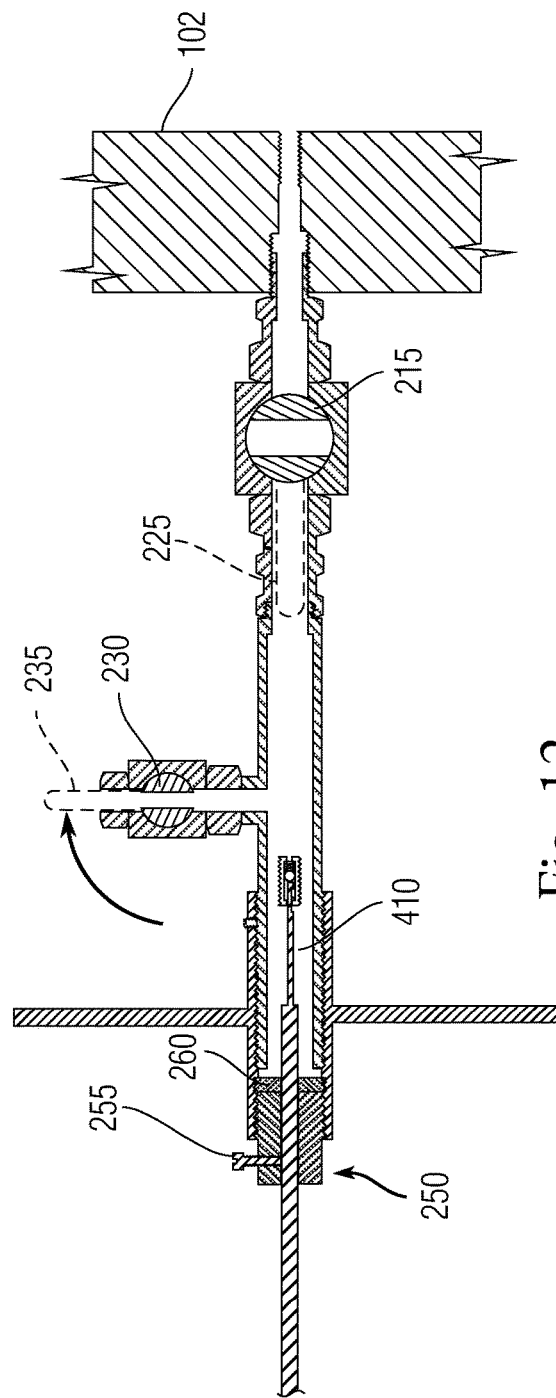

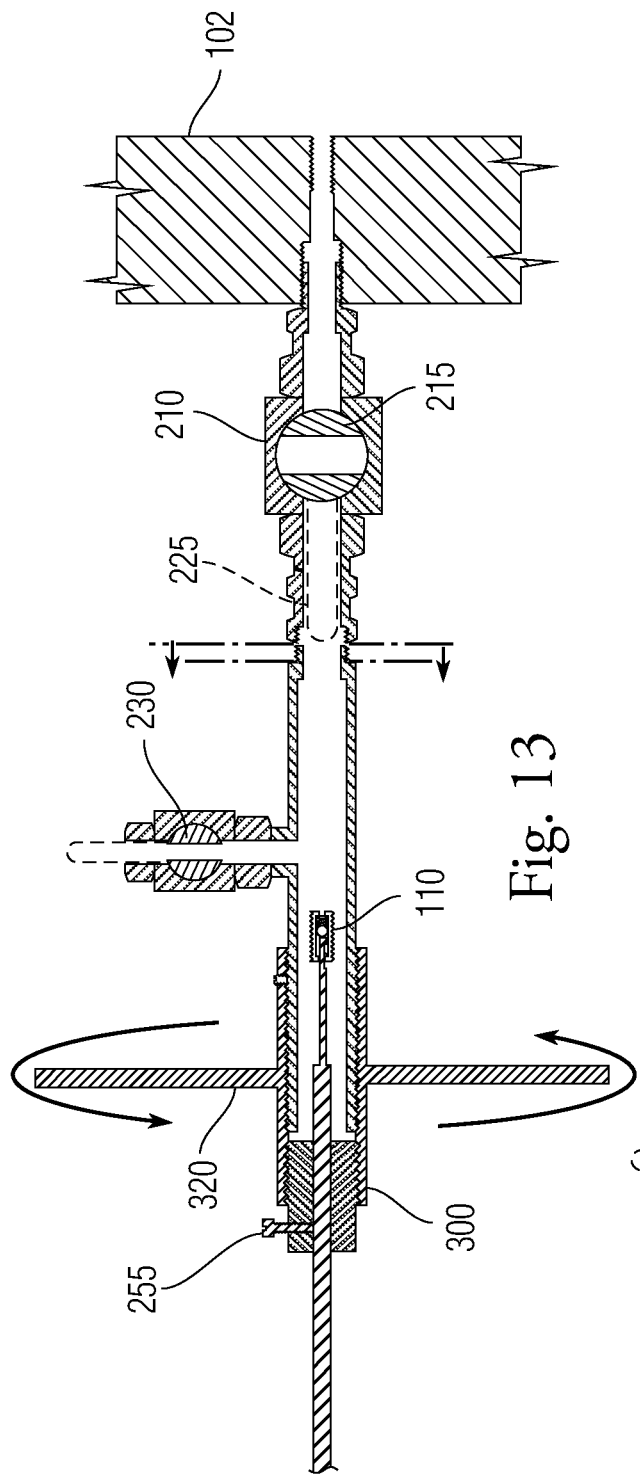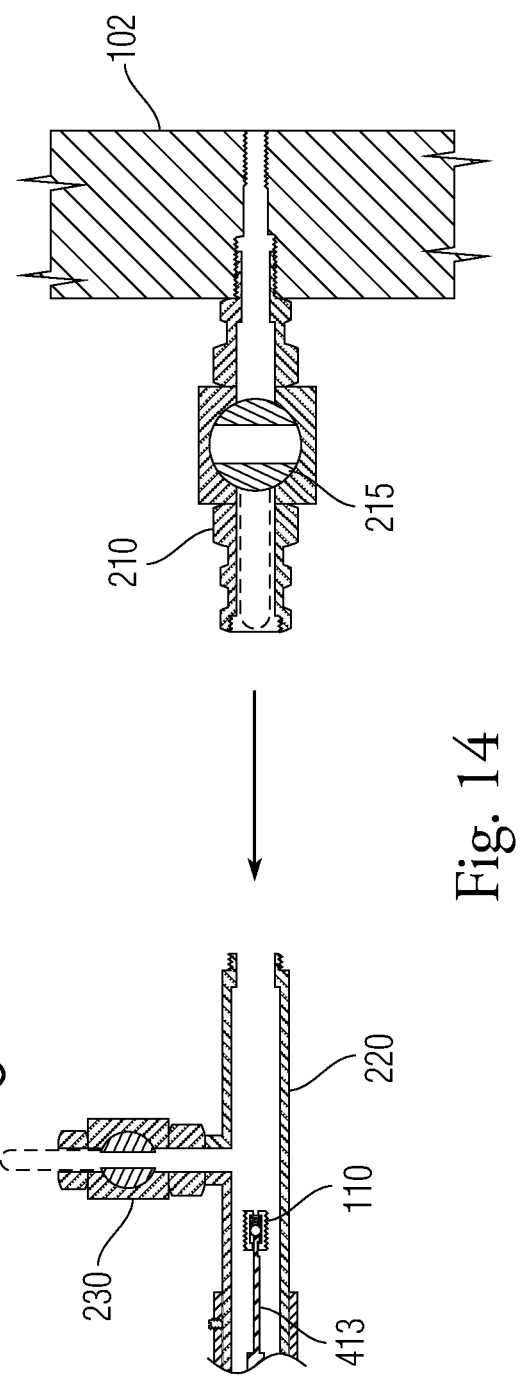
Fig. 13
Fig. 14

INJECTION FITTING INTERNAL CHECK VALVE RETRIEVAL TOOL

TECHNICAL FIELD

The present invention is directed to the field of valve body injection fittings and more particularly, to a tool and method of use for replacing a failed inner check valve that is part of the injection fitting without the need of system shutdown and in a safe manner.

BACKGROUND

As is known, pipelines consist of many pipeline segments that are attached to one another to form a continuous pipeline that can have a number of different pathways and segments. Pipelines includes valves that are intended to control the flow of product through the pipeline. A valve in a fully closed position prevents the product from flowing through the pipeline, while a fully open valve allows for the product to flow through the pipeline.

It is also common for pipelines main isolation valves to include one or more injection fittings fitted on the valve body to allow for sealant injection. Sealant injection fittings are primarily a one-way check valve that is designed to provide for the periodic injection of viscous valve lubricants/sealants into pipeline valves, without allowing the product flowing through the pipeline to escape. Usually, the valve is designed with an internal check valve and the injection fitting in series as an extra layer of protection and to allow for cleaning and replacing the injection fittings when it fails. There are many different types of sealant injection fittings including a bolt type plunger, a two-piece combination fitting, a one-piece combination fitting, double ball check one-piece fitting, single ball check capped fitting, etc.

One concern with injection fittings is that they may fail and leak over time. More particularly, in the event that the check valve in the sealant fitting fails, leakage to atmosphere will result. In certain environments, such as a compressor station, production platform, metering station or pump station, this can lead to an emergency shut down, fire, or even an explosion. There are different commercially available solutions to deal with such injection fitting leakage. One solution is to install a leak-lock adapter that can be attached and tightened to provide a seal (typically by using a gasket or metal seal). Leak-lock adapters are designed such that when they are installed, they stop the leak but the technician is still able to inject lubricant and/or sealant into the valve. However, this type of solution is only a temporary solution until an appropriate time when the system can be taken offline. Also, the inner check valve failure will prevent the sealant injection when the valve fails to seal and the need for a sealant rises. It may get clogged and thus will act as a close valve hindering sealant from passing to the valve seat.

In the event of an injection fitting that comprises double check valves in series, the failure of the inner check valve is especially problematic since the replacement of the inner check valve under current protocol results in the system being shut down since accessing and removing the inner check valve would allow the product in the pipeline to escape.

There is therefore a need to provide a solution for removing and replacing the inner check valve of a double check valve injection fitting without the need of system shutdown and in a safe manner.

SUMMARY

In one aspect, the present invention is directed to a system for retrieving a failed inner check valve that is part of an injection fitting. The system includes a hollow isolation ball valve assembly that includes a first section and a second section that is detachable from the first section. The first section includes a first valve and the second section including a relief valve. The first valve moves between a closed position in which the first section is completely occluded and an open position and can be in the form of a ball valve. The system also includes an extraction tool that is configured to be coupled to and to travel along the isolation ball valve assembly for rotating the isolation ball valve assembly. An elongated inner key is configured to be received into and pass through the hollow isolation ball valve assembly. A distal end of the inner key is configured to engage and unscrew the failed internal check valve for removal thereof.

In another aspect, a method for repairing and replacing a failed inner check valve that is part of an injection fitting that also includes an outer check valve comprises the steps of:
  removing the outer check valve after ensuring no leakage is present;
  attaching a hollow isolation ball valve assembly to the injection fitting location on the main valve, the hollow isolation ball valve assembly including a first section and a second section that is detachable from the first section, the first section including a first valve and the second section including a relief valve, wherein the first valve moves between a closed position in which the first section is completely occluded and an open position;
  coupling an extraction tool to the isolation ball valve assembly and rotating the extraction tool to rotate and attach the isolation ball valve assembly to injection fitting;
  moving the first valve to the open position;
  inserting an elongated inner key through the hollow isolation ball valve assembly until it engages the inner check valve;
  removing the inner check valve with the elongated inner key through the hollowing isolation ball valve assembly;
  closing the first valve once the inner check valve passes by the first valve within the hollow isolation ball valve assembly;
  depressurizing the hollow isolation ball valve assembly by opening the relief valve;
  detaching both the extraction tool and the second section from the first section;
  installing an outer check valve to the first section that remains attached to the injection fitting; and
  opening the first valve.

The results of the above method is that the first valve becomes the innermost valve of the injection fitting and the outer check valve, that is installed on the exposed end of the remaining first section of the isolation ball valve assembly, functions as the outermost valve of the injection fitting, with both valves being in series.

BRIEF DESCRIPTION OF DRAWING FIGURES

FIG. 3A is a side cross-sectional view of the system in a first position;

FIG. 3B is a side cross-sectional view of the system in a second position;

FIG. 4 is a cross-sectional view of an injection fitting including an inner check valve and an outer check valve in a fully assembled condition;

FIG. 5 is a cross-sectional view of the injection fitting with the outer check valve removed from the injection fitting according to a first step of a method, according to one embodiment, for retrieving the failed inner check valve;

FIG. 6 is a cross-sectional view of an isolation ball valve assembly, that is part of the system, coupled to the injection fitting according to a second step;

FIG. 7 is a cross-sectional view of the system according to a third step in which an inner key is inserted into an extraction tool and isolation ball valve assembly, that is coupled to the extraction tool, and is advanced (by rotation in a first direction) into engagement with the failed inner check valve;

FIG. 8 is a cross-sectional view of the system according to a fourth step in which the inner key is rotated in an opposite second direction to remove the failed inner check from the injection fitting;

FIG. 9 is a cross-sectional view of the system according to a fifth step in which the inner key along with the coupled failed inner check valve are withdrawn into the isolation ball valve assembly with the ball valve thereon in an open position;

FIG. 10 is a cross-sectional view of the system according to a sixth step in which the failed inner check valve is advanced within the isolation ball valve assembly beyond the ball valve which is moved to the closed position;

FIG. 11 is a cross-section view of the system according to an optional seventh step in which the failed inner check valve is further advanced in a direction away from the closed ball valve;

FIG. 12 is a cross-sectional view of the system according to an eighth step in which a pressure relief valve is moved to the open position;

FIG. 13 is a cross-sectional view of the system according to a ninth step in which a portion of the isolation ball valve assembly that includes the pressure relief valve and the extraction tool are rotated to remove them from the portion of the isolation ball valve assembly that includes the ball valve;

FIG. 14 is a cross-sectional view of the system according to a tenth step once the extraction tool is removed leaving behind the ball valve coupled to the injection fitting.

DETAILED DESCRIPTION OF CERTAIN EMBODIMENTS

Industrial Valves

Figure 1:
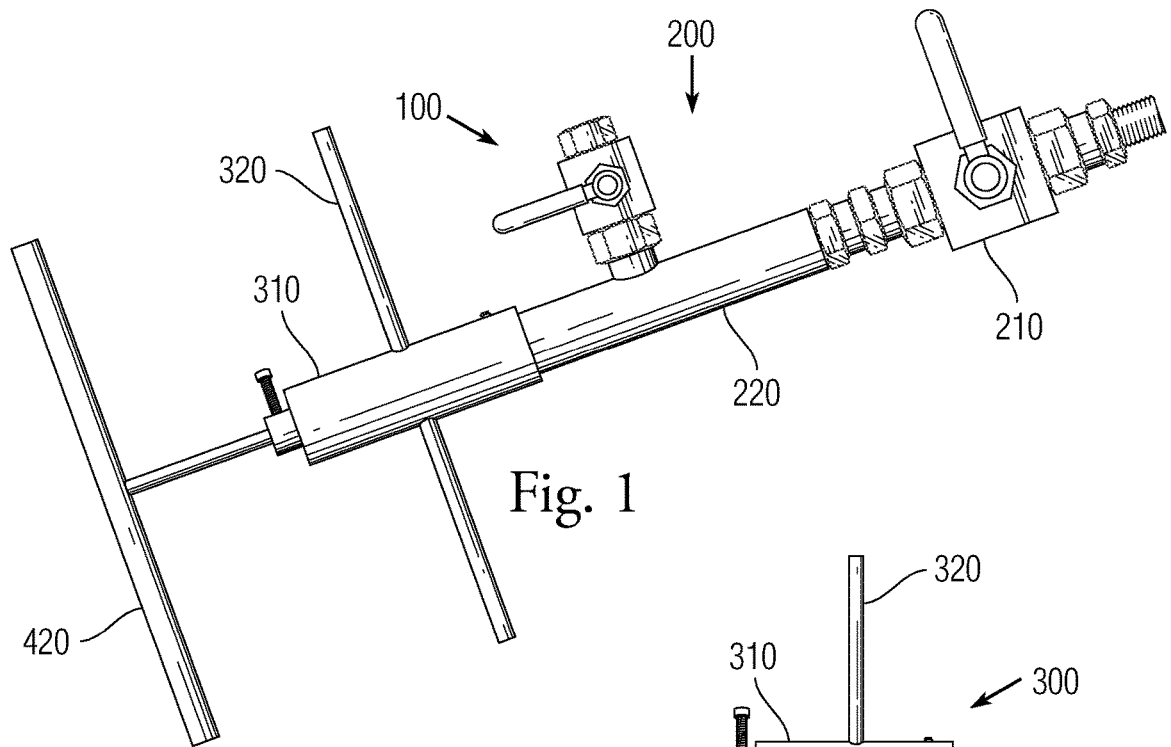
FIG. 1 is a side elevation view of a system for retrieving a failed inner check valve that is part of an injection fitting.

Industrial valves are equipped with injection fittings which are specifically designed to safely inject grease, sealant, cleaners, etc. into valves that are operating under pressure. As shown in FIG. 4, an injection fitting housing (e.g., a main valve body) 102 is illustrated and includes two valves in series and more particularly, the injection fitting housing 102 includes an inner (first) check valve 110 and an injection fitting (an outer (second) check valve) 120 that is in series with the inner check valve 110 and disposed within the injection fitting housing (valve body) 102. The injection fitting 120 can also be referred to as being an outer valve (e.g., outer check valve) that is located within the injection fitting valve body 102, while the valve 110 is an inner valve. The terms "injection fitting" and the "outer (check) valve" are thus used interchangeably in the present disclosure. The injection fitting 120 and the inner check valve 110 are thus coupled to the injection fitting housing 102 which itself is part of an overall larger main pipeline valve (not shown) that is part of a conduit (not shown) (pipeline) through which product flows. The injection fitting 120 is configured and oriented so that it permits a fluid to be injected into the main isolation valve that is located within the pipeline to allow for fluid injection therein. As mentioned herein, the fluid can be in the form of a lubricant or sealant or other fluid that is needed to be injected into a main isolation valve in order to either lubricate the valve internals or to achieve the desired isolation in case the main isolation valve is passing (not holding).

The injection fitting housing 102 is thus associated with a primary (main) isolation valve that is located with the pipeline. The primary isolation valve in the pipeline can take any number of different forms including but not limited to a ball valve.

The injection fitting housing 102 has a bore (main valve injection fitting hole) 151 formed therein that is in fluid communication with the primary valve that is located in the pipeline or other conduit. The bore 151 is thus in fluid communication with the primary valve for injecting fluid therein. The bore 151 is a threaded bore that extends radially outward from the main valve/conduit. It is within the main bore 151 that the check valves 110, 120 are located. The injection fitting 120 thus can be threadingly inserted and contained within the bore 151. As mentioned, the inner check valve 110 and the injection fitting 120 are separate parts and thus, are independently inserted and contained within the bore 151 and can be independently removed therefrom.

As mentioned previously, it becomes problematic if the inner check valve 110 leaks since this can lead to system shutdown, fire or even an explosion. The two check valves 110, 120 can be configured such that they are detachable from one another and thus, can consist of two separate parts that can be contained within a common fitting housing or the like as shown in FIG. 1. The inner check valve 110 is thus, threaded at a more internal location within the bore 151 than the injection fitting 120. In this arrangement, in order to access the inner check valve 110, the injection fitting 120 must be removed. Thus, in some embodiments, the injection fitting 120 can be unscrewed to access the inner check valve 110 (see FIG. 5); however, since the entire system is under pressure, the inner check valve 110 valve cannot be simply removed and further, the inner check valve 110 has failed and thus, product flowing through the underlying valve and pipeline can be vented into atmosphere.

In the instances in which the inner check valve 110 and the injection fitting=120 are inserted into the bore 151 in a housing that surrounds the valves, each of the inner check valve 110 and the injection fitting 120 can have outer threaded bodies that threadingly mate with inner threads of the bore 151. In this way, the inner check valve 110 and the injection fitting 120 can be screwed into the bore 151 or unscrewed therefrom.

It will be appreciated that the inner valve 110 and the injection fitting 120 are illustrated as containing a ball check valve; however, these are merely exemplary types of valves and other types of valves can be used as the inner valve 110 and the injection fitting valve.

System 100

Figure 2:
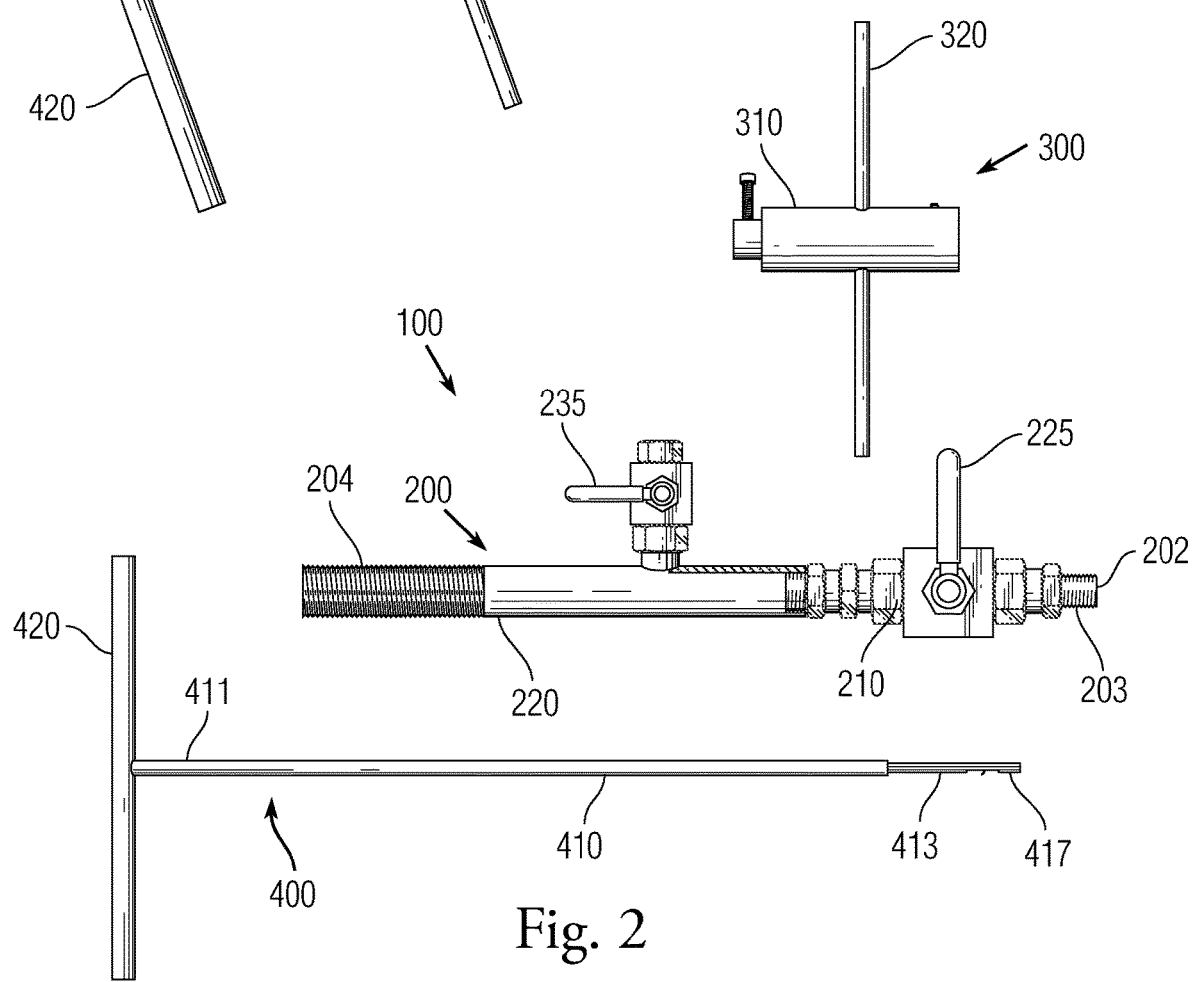
FIG. 2 is an exploded side elevation view of the parts that form the system.

Now referring to FIGS. 1-3 in which a system 100 for retrieving a failed internal check valve that is part of an injection fitting is disclosed. As described herein, the system 100 is in the form of a tool that is formed of a number of separate parts that interact with one another to allow not only the failed internal (inner) check valve to be removed but also provides a replacement internal check valve. This is all achieved by the system 100 in a safe manner without shutting down or interrupting the operation and without jeopardizing maintenance crew safety or equipment reliability and operability.

As mentioned, the disclosed system 100 is formed of a number of parts that are used together to achieve the intended operations described herein. Each of the major components of the system 100 is described below.

Isolation Valve Assembly 200

The system 100 includes an isolation valve assembly 200 that itself is formed of several parts that are detachably connected to one another. More specifically, the isolation valve assembly 200 includes a first valve section 210 and a second valve section 220 that together define an elongated tubular structure. The assembled isolation valve assembly 200 has a first end 202 and an opposing second end 204. The first end 202 of the overall assembly 200 can be a distal end of the first valve section 210 and the second end 204 of the overall assembly 200 can be a proximal end of the second valve section 220. As shown, the proximal end of the isolation valve assembly 200 can include outer threads.

The first section 210 and the second section 220 can be coupled to one another using any number of techniques including but not limited to a threaded attachment as shown. In one embodiment, the first section 210 and the second section 220 can be joined to one another at location 221 by a threaded attachment as shown in FIG. 3A. This allows for the easy removal of the second section 220 from the first section 210 after retrieval of the inner check valve 110 and to be able to install a replacement valve (replacement check valve for example) as described with reference to FIG. 15. For example, a threaded proximal end of the first section 210 can be joined to a threaded distal end of the second section 220 to allow for attachment of the two parts 210, 220 to create the longer elongated part (See, FIG. 3A). It will be appreciated that other techniques can be used to join the first and second sections 210, 220. The hollow interior of the first section 210 and the hollow interior of the second section 220 thus are axially aligned and define a continuous inner lumen (inner passage).

Each of the first end 202 and the opposing second end 204 can include outer threads to allow for attachment of the assembly 200 to other parts. Alternatively, as shown, the first end 202 can include outer threads 203 that are configured to mate within the inner threaded bore 151, while the second end 204 can include inner threads (See, FIG. 3A). In this way, the assembly 200 can be screwed into the bore 151 using outer threads 203 as described herein.

The isolation valve assembly 200 includes a first valve 215 that is disposed therein and is configured such that the first valve 215 operates between an opened position in which fluid can flow through the first valve 215 and a closed position in which fluid is prevented from flowing through the first valve 215. The first valve 215 can comprise any number of different types of valves that are suitable for use with the injection fitting 100. In the illustrated embodiment, the first valve 215 comprises a ball valve and thus, the assembly 200 can be considered to be an isolation ball valve assembly. It will be understood that the bore 151 of the valve shall be considered in order to allow for the retrieval of the inner check valve 110. For example, a reduced bore valve will not allow for failed inner check valve to pass.

As is known, a ball valve is a form of quarter-turn valve which uses a hollow, perforated and pivoting ball to control flow through it. It is open when the balls hole is in line with the flow and closed when it is pivoted 90-degrees by a valve handle 225 (e.g., a lever handle). The valve handle 225 lies flat in alignment with the flow when open, and is perpendicular to it when closed, making for easy visual confirmation of the valve's status. A ball valve should not be confused with a "ball-check valve", such as the inner check valve 110 and outer check valve 120, which is a type of check valve that uses a solid ball and a spring to force the ball against the seat thus preventing undesired backflow.

As shown, the first valve 215 is located within the first section 210 of the isolation valve assembly 200 and similarly, the valve handle 225 is part of the first section 210.

Relief Valve 230

The second section 220 includes a second valve 230 that like the first valve 215 can be operated externally. The second valve 230 is a relief valve and more particularly, is a pressure relief valve. Any number of suitable valve types can be used for the second valve 230 including a ball valve as shown. As is known, the pressure is relieved, after closing the first valve 215 and ensuring no more pressure is building up in the tool (system 100) by allowing the pressurized fluid to flow from an auxiliary passage out of the system. The relief valve 230 can be manually operated so that at a given time, as described herein, the user manually opens the relief valve 230 using a valve handle (e.g., lever) 235 to release pressure from the system. When in the form of a lever, by turning the lever, the relief valve 230 opens and pressure is released. As will be discussed herein, this action allows any pressure within the assembly 200 to be vented to atmosphere.

As shown, the relief valve 230 is typically a side extension that protrudes outwardly from the main body of the second section 220. This side extension can be formed at a 90 degree angle relative to the main body of the second section 220. This side extension and the relief valve 230 can be located at one end of the second section 220 and thus, the relief valve 230 is located closer to the first valve 215 than the opposite open end of the second section 220.

The relative lengths of the first section 210 and the second section 220 can vary and as illustrated, the first section 210 can be shorter than the second section 220.

The isolation valve assembly 200 can be formed of any number of suitable material, including rigid plastics and metals. In addition, the tubular structure can have any number of shapes.

While the coupling between the first section 210 and the second section 220 can be a threaded coupling in which one part is screwed into the other, other types of couplings are possible, such as the use of a quick connect connector.

Extraction Tool 300

The system 100 also includes an extraction tool 300 includes a hollow body 310 that includes a first handle 320. The hollow body 310 can be a tubular structure that is configured to receive and surround the proximal end of the second section 220. The construction of the extraction tool 300 and the second section 220 is such that when the two are coupled to one another, the extraction tool 300 and the second section 220 rotate in unison (rotate together). As described herein, the tool 300 and in particular, the first handle 320 thereof can thus be the means for grasping and rotating the isolation valve assembly 200 since these two parts are attached to one another and rotation of the isolation valve assembly 200 allows for the threaded end of the first section 210 to be screwed into the bore 151 and conversely, allows for the isolation valve assembly 100 to be unscrewed from the bore 151. However, once the isolation valve assembly 200 is installed in the injection fitting housing bore 151, it does not further rotate and the extraction tool 300 is used in the manner described below to advance the inner key 400 toward the failed inner check valve 110.

The first handle 320 can be in the form of two bars that extend outwardly from the hollow body 310 at locations opposite one another (180 degrees apart).

The extraction tool 300 can include a locking feature that allows the extraction tool 300 to be detachably attached to the second section 220 to allow the two to rotate in unison. For example, there can be a keyed connection between the two parts. For example, a pin in groove arrangement can be provided in which one of these parts has a male feature (e.g., a rail or protrusion) that is received within a female feature (e.g., a channel or groove). If the male and female features are not properly aligned, the two parts do not fit together properly. Other techniques can be used such as having a set screw that seats against the second section 220 to attach the tool 300 to the second section 220. It will be appreciated that other techniques can be used such as having a non-circular shape for both the second section 220 and the tool 300. The second section 220 can include a stop or the like to limit the degree of insertion of the tool 300 over the second section 220. In other words, the stop limits the forward travel of the tool 300 over the second section 220.

It will be understood that when the extraction tool 300 is attached to the isolation valve assembly 200, it does not obstruct or in any way interfere with the center lumen of the isolation valve assembly 200 which remains open at its ends.

In the illustrated embodiment, it is seen that the extraction tool 300 has inner threads at its distal end that mate with outer threads formed along the outside of the isolation valve assembly 200. The distal end of the extraction tool 300 can thus be threaded onto the outside of the isolation ball valve assembly 200 in a sealed manner. The length of the outer threads defines a degree of travel of the extraction tool 300 over the isolation valve assembly 200. More specifically, as described below, during installation, the isolation valve assembly 200 is fixedly attached to the injection fitting housing 102, while the extraction tool 300 is intended to be advanced forward and rearward relative to the isolation valve assembly 200 by being screwed forward or unscrewed rearward over the isolation valve assembly 200.

As described herein, when connected to the injection fitting 100, the isolation valve assembly 200 constitutes a pressurized vessel and thus, there is an end cap or the like at the second end 204. In this case, the proximal end of the isolation valve assembly 200 is mated to the extraction tool 300, as mentioned above, and the extraction tool 300 itself is capped off with a packing assembly 250. For example, the packing assembly 250 can be provided at the proximal end of the extraction tool to provide a sealed environment. In particular, the packing assembly 250 can include a packing flange or end cap 252 that is coupled to and closes off end 204. For example, the packing flange 252 can include threads (outer threads in FIG. 3A) that mate with the threads at the proximal end of the extraction tool 300 (inner threads in FIG. 3A). The packing flange 252 includes a longitudinal through hole that receives another part of the system as described below. The packing flange 252 also includes a side hole that receives a set screw 255 or the like. The packing assembly 250 also includes one or more internal sealing elements 260, such as packing rings, that are located internally within either the extraction tool 300 or within the packing flange 252 that is attached to the extraction tool, While not shown, the distal end of the tool 300 can be configured to be received within the open end of the second section 220 for attaching the two in manner that allows rotation in unison.

The extraction tool 300 can be formed of any number of different materials including but not limited to rigids plastics and metals.

Inner Key 400

The system 100 also includes an inner key 400 that is configured to be inserted into and pass through the center lumen of the isolation valve assembly 200. The inner key 400 has a first portion that is in the form of an elongated shaft 410 and a second handle 420 that can be formed at one end (proximal end) of the shaft 410. The second handle 420 can be an elongated bar that is formed perpendicular to the shaft 410 such that the inner key 400 has a T-shape construction.

The inner key 400 is specifically made to securely engage the inner check valve 110 and more particularly, the inner key 400 is designed to retrieve the inner check valve 110 from the bore 151. The shaft 410 can have two different cross-sectional shapes along its lengths. In other words, the shaft 410 can include a first section 411 (proximal section) that has a first cross-section (e.g., cylindrical shaped) and a second section 413 (distal section) that has a second cross-section (e.g., polygonal shaped). The outer end of the inner check valve 110 can include a shaped hole, such as a hexagonal shaped hole or square shaped hole into which the distal end (second section 413) of the inner key 400 is inserted. In order to remove the failed inner check valve 110, the inner check valve 110 needs to be unscrewed from the bore 151. The engagement of the distal end of the inner key 400, which has a complementary shape (e.g., hexagonal shaped or square shaped) to the shaped hole of the inner check valve 110, allows the inner key 400 to unscrew the inner check valve 110 from the bore 151 by rotation of the inner key 400 as described herein.

As shown in the figures, the packing assembly 250 provides a means for coupling the inner key 400 to the extraction tool 300. In particular and as mentioned previously, the packing assembly 250 is inserted into and coupled to the extraction tool 300 and the inner key 400 passes through the packing assembly 250 and can be coupled thereto. Thus, these three elements are coupled to one another and when the inner key 400 is temporarily locked to the packing assembly 250 using the set screw 255, the forward and rearward movement of the extraction tool 300 over the isolation valve assembly 200 is likewise translated into forward and rearward movement of the inner key 400. In other words, the extraction tool 300 and the inner key 400 can move in unison as described herein as when the inner key 400 is drive forward to allow for insertion into the failed inner valve 110.

In particular, the extraction tool 300 and the first handle 320 thereof, are used to drive the second section 413 toward the failed inner check valve 110 to unscrew it from the bore 151. Initially, the extraction tool 300 can be advanced forward over the outer threads of the isolation valve assembly 200 by rotating the first handle 320. This results in the inner key 400 also being driven forward. Once the distal end of the inner key 400 is located close to the failed inner valve 110, the first handle 320 and the second handle 420 are turned in such a way to move the second section 413 first toward the injection fitting housing 102 at the same using the handles 310, 420. In other words, in order to insert the second section 413 into the open socket of the failed inner valve 110, the two handles 310, 420 can be rotated in order to achieve proper alignment and reception of the second section 413 of the inner key 400 into the open socket. Since the distal end of the second section 413 has a keyed shape (like a hex shape), it has to be properly aligned with the complementary hex shaped of the socket in order for the final advancement and insertion of the distal end into the socket.

As mentioned, after removing the old injection fitting 120 and installing the isolation valve assembly 200 on the injection fitting housing 102, the isolation valve assembly 200 does not rotate. Instead, the handles 320, 420 are used together to drive the second section 413 until it reaches the inner check valve 110. Once the second section 413 reaches the failed inner check valve 110, it is then inserted into the exposed end of the inner check valve 110. The second section 413 can only rotate the inner check valve 110 after it is received therein (e.g., an Allen key type arrangement is needed in order to rotate the inner check valve 110 after insertion of the Allen key into the open socket end of the inner check valve 110). The handles 320, 420 are then turned in such a way to move the second section 413 away from the injection fitting housing 102. It will be appreciated that rotating the inner key 400 in an opposite direction will unscrew the failed inner valve 110 and if the extraction tool 300 is also rotated in the opposite direction using handle 320, the extraction tool 300 and inner key 400 will move rearwardly away from the injection fitting housing.

In addition, the distal end of the inner key 400 can have a locking mechanism that is configured to lock to the inner check valve 110 to establish a secure connection between the inner key 400 and the inner check valve 110. This allows, as described below, the inner key 400 to not only unscrew the inner check valve 110 from the bore 151 but also remove the inner check valve 110 through the center lumen of the isolation ball valve assembly 200.

The engagement or locking mechanism of the inner key 400, according to one embodiment, is best understood by viewing FIGS. 2 and 6. More particularly, the distal end of the second section 413 can include an indented or recessed portion 417. Within this recessed portion 417 there is one or more engagement elements, such as a flexible hook (finger) or an angled hook structure as shown. As discussed herein, when retrieving the failed inner check valve 110, the flexible hook is configured to hook onto the spring that is contained in the inner check valve 110. The flexible hook is angled and flexes in one direction that allows unimpeded insertion of the flexible hook into the spring when the inner key 400 is advanced forward; however, then the inner key 400 is moved in the opposing direction to remove the inner check valve 110, the flexible hook catches and locks onto the coils of the spring in the check valve thereby, grasping the inner check valve 110. This action is described below.

The flexible hook can be formed of any number of suitable materials, such as a memory material, such as one formed of metal or a polymer of an elastomeric material, etc.

The dimensions of the inner key 400 are such that it can be fed through the inner lumen of the isolation ball valve assembly 200. In particular, it is inserted into the second section 220 and fed through the inner lumen until it exits the first section 210 and can engage the inner check valve 110 for removal thereof from the bore 151.

It will be seen that the degree of travel of the inner key 400 within the isolation ball valve assembly 200 is limited by the second handle 420 in that once the second handle 420 contacts the end of the extraction tool 300, it cannot be inserted anymore.

The inner key 400 can be formed of any number of different materials, including but not limited to rigid plastics and metals.

Method of Operation (Use)

It will be appreciated that while the method of operation is broken down into the following steps; one or more of these steps may be combined and/or eliminated and therefore, the method of the present invention is not limited to the practice of the following steps and the order of the steps is not limited by the following description.

Step 1—Inspection of the Injection Fitting 100

The operator should visually inspect the injection fitting 120 and confirm that the defective internal check valve 110 is not passing or leaking any media through the injection fitting 120. In the event that it is determined that a leak is occurring, then other remedial action is taken.

Step 2—Removal of the Injection Fitting (Outer Check Valve) 120

In the event that the injection fitting 120 is not leaking, then the injection fitting 120 is removed from the injection fitting housing 102 (i.e., from the bore 151 located therein). However, before removing the injection fitting 120, the operator should inspect the integrity of the inner check valve 110 by using a conventional method such as a stringer that connects to the injection fitting 120 and a needle is slowly screwed to push the ball of the check valve to ensure that there is no leakage from the internal check valve 110. This can be achieved using a conventional tool and unscrewing the injection fitting 120 from the injection fitting housing 102. This step allows for the inner check valve 110 to be accessed in the bore 151 of the injection fitting housing 102. This step is shown in FIG. 5.

Step 3—Installation of Isolation Valve Assembly 200

Once the injection fitting 120 is removed, the isolation valve assembly 200 is installed into the injection fitting housing 102 in a sealed manner as shown in FIG. 6. For example, the threaded distal end of the first section 210 can be connected to the injection fitting 120. The threaded distal end has outer threads that mate with inner threads of the bore 151 to connect the first section 210, and thus the assembly 200, to the injection fitting housing 102. This connection results in the inner lumen of the isolation valve assembly 200 being fluidly connected to the bore 151 formed in the injection fitting housing 102. In this configuration, the isolation valve assembly 200, like the removed injection fitting 120, protrudes outwardly from the main valve and can be considered to be arranged in series with the inner check valve 110 that is still located within the injection fitting housing 102.

The isolation valve assembly 200 can be screwed onto the injection fitting housing 102 using a conventional tool such as a wrench or the like.

The first valve 215 remains in the closed position.

Step 4—Connection of Extraction Tool 300

As shown in FIG. 7, once the isolation ball valve assembly 200 is connected to the injection fitting housing 102, the extraction tool 300 is connected to the isolation ball valve assembly 200. This connection will also couple the inner key 400 to the isolation ball valve assembly 200 since the inner key 400 is coupled to the extraction tool 300 through the packing assembly 250.

As previously mentioned, the extraction tool 300 can be connected in any number of different ways with the result being that the extraction tool 300 is coupled to and surrounds the second section 220 of the isolation valve assembly 200.

As mentioned, the proximal end of the second section 220 can include outer threads that mate with inner threads of the extraction tool 300.

In an initial position after the extraction tool 300 is first coupled to the isolation valve assembly 200, the distal end of the inner key 400 is spaced from the failed inner valve 110. In other words, the distal end of the inner key 400 has not yet been advanced forward into engagement with the socket of the failed inner valve 110. FIG. 3A shows the initial position in which the extraction tool 300 is partially screwed onto the isolation ball valve assembly 200 and the distal end of the inner key is not yet advanced distally beyond the distal end of the isolation valve assembly 200. In other words, the distal end of the inner key 400 can be contained within the interior of the isolation valve assembly 200 as shown in FIG. 3A.

Step 5—Open First Valve of Isolation Ball Valve Assembly

As shown in FIG. 7, the first valve 215 of the isolation valve assembly 200 is then moved to the fully open position. This is achieved by moving the valve handle 225 to the fully open valve position. As mentioned, the first valve 215 can be in the form of a ball valve and in the fully open position, the ball valve does not occlude the inner lumen of the isolation valve assembly 200 since the ball's hole is in line with the flow (inner lumen).

Step 6—Insertion of Inner Key 400

As also shown in FIG. 7, with the first valve 215 in the fully opened position, the elongated inner key 400 can be inserted and passed through the length of the isolation valve assembly 200. The inner key 400 is inserted and fed forward by using tool 300 as by rotating the handle 320) until the distal end of the inner key 400 aligns with and engages the inner check valve 110. For example, the inner key 400 is advanced in a screw-like manner by rotation of the tool 300 about the outer threads of the isolation valve assembly 200 As mentioned herein, since the inner key 400 is coupled to the extraction tool 300 through the packing assembly 250, the forward advancement of the extraction tool 300 over the isolation valve assembly 200 (which remains fixed to the injection fitting housing 102 and is stationary) results in forward advancement of the inner key 400 allowing the inner key 400 to travel beyond the distal end of the isolation valve assembly 200 as shown in FIG. 7.

It will be appreciated that the inner key 400 is first inserted into and through the packing assembly 250 (through the hole formed therein) and also passes through the packing rings (sealing elements) 260. A seal is formed between the first section 411 of the inner key shaft 410 and the packing rings 260, whereby the extraction tool 300 and the isolation valve assembly 200 thus constitute a closed, sealed vessel. The inner key 400 can move axially within the packing assembly 250 and the packing rings 260 that are fixed to and inside the extraction tool 300. Once the distal end of the inner key 400 is at the inner check valve 110, the inner key 400 is inserted into the open socket of the inner check valve 110.

Step 7—Removal of the Inner Check Valve 110

As shown in FIG. 8, once the inner key 400 is engaged with the inner check valve 110, the second handle 420 is then turned (rotated) in the direction that causes the unscrewing of the inner check valve 110. The inner check valve 110 is unscrewed such that it is backed out of the bore 151 (FIG. 8) and enters into the inner lumen of the first section 210 of the isolation valve assembly 200 (FIG. 9). In this step, the inner key 400 is used to back out the attached inner check valve such that the inner check valve 110 passes the open first valve 215 (ball valve). This action can take place without rotation of the extraction tool 300; however, unscrewing of the extraction tool 300 will likewise result in a backing out of the inner key 400. In other words, the inner check valve 110 is advanced toward the second section 220 and clears the location of the first valve 215 as shown in FIG. 10.

It will also be appreciated that the removed inner check valve 110 remains attached to the inner key 400 once it exits the threaded bore 151 and enters the first section 210 of the isolation valve assembly 200 since the flexible hook engages and ensnares the spring contained within the inner check valve 110, thereby allowing the inner key 400 to carry the removed inner check valve 110. It will be appreciated that other techniques can be used to capture the inner check valve 110 with the inner key 400 to allow for removal of the inner check valve 110 in the manner described herein.

Step 8—Close First Valve 215

As shown in FIG. 10, once the inner check valve 110 internally advances beyond the first valve 215 in the direction towards the second section 220, the first valve 215 is closed since the inner key 400 and the coupled inner check valve 110 have cleared the first valve 215 and no longer interfere with closing of the first valve 215. It will be appreciated that the first valve 215 now can fully function as a replacement inner check valve since when it is closed, the injection fitting remains closed. The first valve 215 is closed by turning the valve handle 225. FIG. 11 illustrates further retraction of the inner key 400 and inner check valve 110 that is attached thereto. FIG. 11 also shows an optional step of temporarily locking the inner key 400 using the set screw 255. The locking step ensures that accidental movement of the inner key 400 is prevented and this can be helpful when the user performs other steps, such as closing the pressure relief valve 230.

Step 9—Depressurization

As shown in FIG. 12, once the inner check valve 110 internally advances beyond the first valve 215, the system (i.e., the isolation valve assembly 200) is depressurized by opening the relief valve 230. As mentioned, the relief valve 230 vents to atmosphere and since the closed first valve 215 closes off and seals the injection fitting and the packing assembly 250 seals the other end of the isolation valve assembly 200, opening the relief valve 230 releases pressure within the isolation valve assembly 200.

Step 10—Detachment of Extraction Tool and Relief Valve

After depressurization, the extraction tool 300 and the second section 220, to which the extraction tool 300 is attached, are removed from the first section 210 of the isolation valve assembly 200. The removal of the isolation valve assembly 200 can be done using a tool, such as a wrench. This action is shown in FIGS. 13 and 14. This results in the first section 210 being left behind in a fluid, sealed connection with the injection fitting. The first valve 215 remains closed. As mentioned, the first valve 215 acts now as a replacement inner check valve for the injection fitting. As such it is intended to be securely and sealingly attached to the injection fitting and the valve handle 225 is fully operational to open and close the first valve 215.

The detachment can occur by unscrewing the second section 220 from the first section 210. Once removed, the threaded end of the first section 210 is left exposed. The threads can be inner threads at this end of the first section 210.

Step 11—Install a New Fitting

Figure 15:
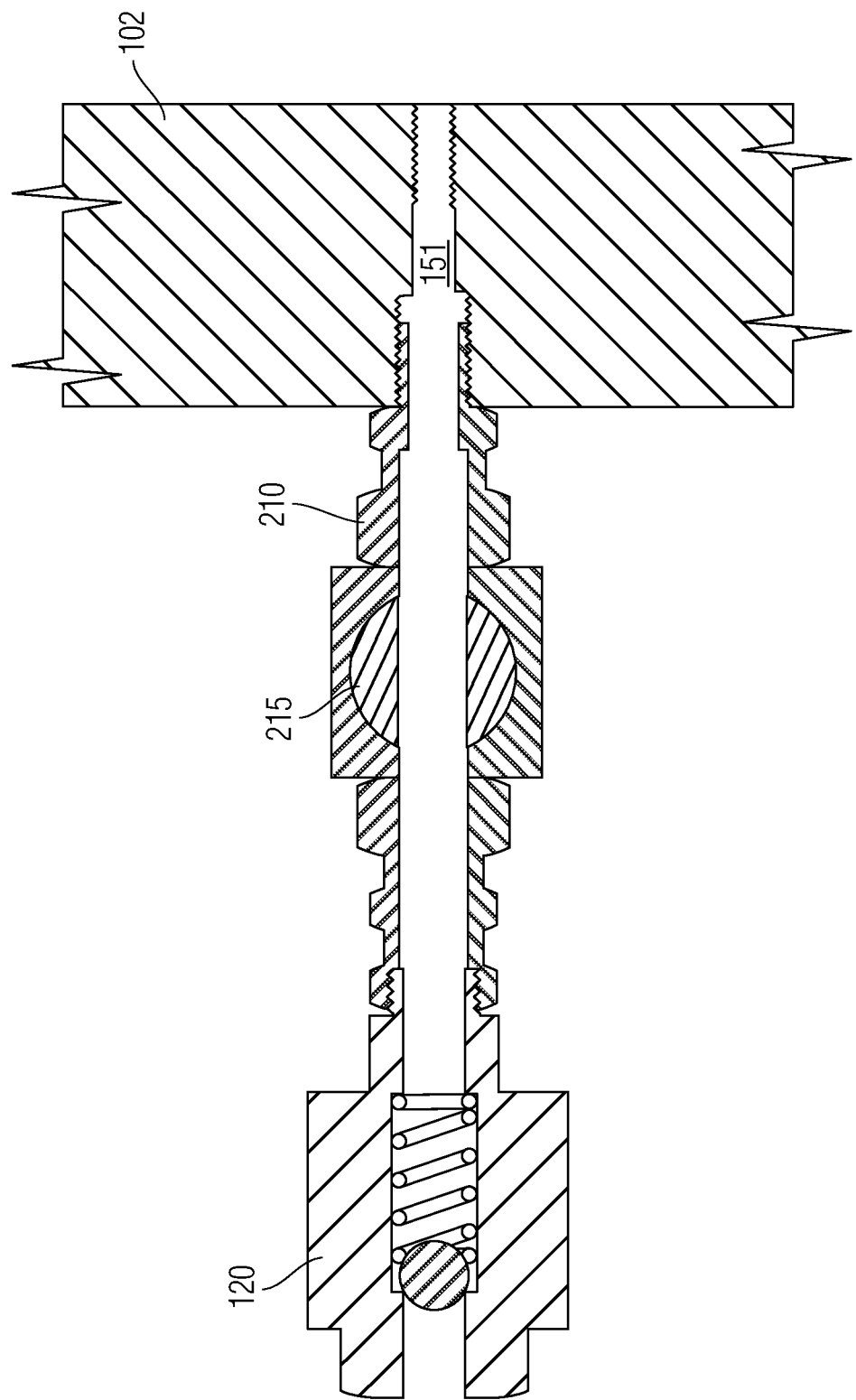
FIG. 15 is a cross-sectional view of the system according to an eleventh step in which an outer check valve is coupled to the ball valve in series.

As shown in FIG. 15, once the extraction tool 300 and the second section 220 are removed from the first section 210, a new fitting can be directly installed on the first section 210 of the isolation valve assembly 200. This new fitting can be in the form of the injection fitting 120. It will be appreciated that the installation of this new fitting results in two new valves being located in series, namely, the first valve 215 (which constitutes the inner check valve) and the new fitting which constitutes an outer (check) valve. Both of these new valves are fluidly connected to the bore 151 and thus provide a proper injection fitting into the main valve.

Step 12—Open the First Valve 215

The first valve 215 is opened using the valve handle 225 to the fully opened position as shown in FIG. 15. This permits valve injection operation to resume through the newly installed injection fitting.

Step 13—Remove Valve Handle 225

As shown in FIG. 15, the valve handle 225 is removed to accidental closure of the inner check valve (the first valve 215).

Based on the foregoing procedure, it will be recognized that the net result is that there are once again two valves placed in series within/coupled to the injection fitting housing 102. The system 100 provides a solution for when the inner check valve 110 becomes clogged. The system 100 allows for the removal of the clogged inner check valve 110, thereby allowing for sealant injection process. Clogged inner check valves can be a common issue and causes unplanned shutdown due to the fact that the equipment cannot be isolated because the main isolation valve is not holding and the operator cannot inject sealant because the inner check valve is plugged.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt an instrument, situation or material to the teachings of the invention without departing from the essential scope thereof. Therefore, it is intended that the invention not be limited to the embodiment disclosed as the best mode contemplated for carrying out this invention, but that the invention will include all embodiments falling within the scope of the appended claims.

What is claimed is:

1. A system for retrieving a failed inner valve that is part of an injection fitting housing comprising:
   a hollow isolation valve assembly that includes a first section and a second section that is detachable from the first section, the first section including a first valve and the second section including a relief valve, wherein the first valve moves between a closed position in which the first section is completely occluded and an open position;
   an extraction tool that is configured to be coupled to and travel along the hollow isolation valve assembly for rotating the hollow isolation valve assembly; and
   an elongated inner key that is configured to be received into and pass through the hollow isolation valve assembly, wherein a distal end of the inner key is configured to engage and unscrew the failed inner valve for removal thereof.

2. The system of claim 1, wherein the first section of the hollow isolation valve assembly includes a threaded distal end and an opposing threaded proximal end and the second section includes a threaded distal end that screws onto the threaded proximal end of the first section, the threaded distal end of the first section being configured for screwing onto the injection fitting housing.

3. The system of claim 1, wherein the first valve comprises a high-pressure ball valve with a detachable handle for moving the first valve between the closed position and the open position.

4. The system of claim 1, wherein the hollow isolation valve assembly comprises a tubular structure that has a threaded distal end that is configured for screwing onto the injection fitting housing.

5. The system of claim 1, wherein the extraction tool has a tubular shape and is coupled to and surrounds the second section of the hollow isolation valve assembly.

6. The system of claim 1, wherein the extraction tool includes a first handle for rotating the coupled extraction tool and the hollow isolation valve assembly in unison.

7. The system of claim 5, wherein the extraction tool only surrounds the second section of the hollow isolation valve assembly and the relief valve is located between the extraction tool and the first valve.

8. The system of claim 1, wherein the relief valve is configured to vent the hollow isolation valve assembly to atmosphere when open.

9. The system of claim 1, wherein the elongated inner key has a handle at a proximal end and a degree of forward travel of the elongated inner key is restricted by the handle of the elongated inner key contacting the extraction tool.

10. The system of claim 1, wherein the elongated inner key has a locking feature at the distal end for locking the distal end to the failed inner valve.

11. The system of claim 1, wherein the distal end of the elongated inner key is polygonal shaped.

12. The system of claim 1, further including a sealing element that is disposed within at least one of the hollow isolation valve assembly and the extraction tool and is configured to seal against the inner key while permitting axial movement of the inner key within the hollow isolation valve assembly.

13. The system of claim 12, wherein the sealing element comprises a packing assembly that includes a packing flange and a plurality of packing rings, the inner key passing through both the packing flange and the plurality of packing rings to which the inner key is in sealed contact.

14. The system of claim 1, wherein the inner key has a proximal section having a first cross-sectional shape and a distal section having a second cross-sectional shape different from the first cross-sectional shape, the distal section having an indented section that includes one or more flexible hooks that are configured to flex into and be contained within the failed inner valve in a fully retracted position after engaging the failed inner valve.

15. The system of claim 14, wherein the failed inner valve comprises an inner check valve having a biasing element that applies a force to a ball check valve and each flexible hook is configured to engage and be ensnared within the biasing element for securely hooking the inner check valve onto the inner key.

16. A system for removing and replacing a failed inner valve that is part of an injection fitting housing that is configured for delivering a fluid to a main valve comprising:
   a hollow isolation and replacement valve assembly that includes a first section and a second section that is detachable from the first section, the first section including a first valve and the second section including a pressure relief valve, wherein the first valve moves between a closed position in which the first section is completely occluded and an open position;

an extraction tool that is configured to be coupled to and to travel along the hollow isolation and replacement valve assembly for rotating the hollow isolation and replacement valve assembly for assisting in coupling of the hollow isolation and replacement valve assembly to the injection fitting housing; and an elongated inner key that is configured to be received into and pass through one or more of the extraction tool and the hollow isolation and replacement valve assembly, wherein a distal end of the inner key is configured to engage and remove the failed inner valve.

\* \* \* \* \*